United States Patent [19]

Waugh et al.

[11] Patent Number: 4,645,556
[45] Date of Patent: * Feb. 24, 1987

[54] SUBSTRATELESS DECORATIVE EMBEDDED ARTICLE AND METHOD OF MAKING

[75] Inventors: Robert E. Waugh, Sun City Center, Fla.; Urban R. Nannig, North Kingstown, R.I.; Clyde R. Rockwood, Columbus, Ohio

[73] Assignee: The D. L. Auld Company, Columbus, Ohio

[*] Notice: The portion of the term of this patent subsequent to Oct. 7, 2003 has been disclaimed.

[21] Appl. No.: 820,383

[22] Filed: Jan. 21, 1986

Related U.S. Application Data

[63] Continuation-in-part of Ser. No. 744,128, Jun. 12, 1985, Pat. No. 4,615,754.

[51] Int. Cl.4 .................................................. B60R 13/04
[52] U.S. Cl. ............................................ 156/242; 156/247; 156/249; 264/130; 264/131; 264/132
[58] Field of Search ........................ 156/242, 247, 249; 264/130, 131, 132

[56] References Cited

U.S. PATENT DOCUMENTS

| | | | |
|---|---|---|---|
| 1,693,561 | 11/1928 | Klein ................................. | 427/282 |
| 2,021,961 | 11/1935 | MacFarlane ....................... | 264/130 |
| 2,354,857 | 8/1944 | Gits et al. ........................ | 428/187 X |
| 2,376,305 | 5/1945 | Bauer ............................... | 428/187 X |
| 3,235,396 | 2/1966 | Haberlin .......................... | 428/40 |
| 3,964,906 | 6/1976 | Kenney ............................ | 427/54 X |
| 3,974,311 | 8/1976 | Cherrin ............................ | 428/43 |
| 4,100,010 | 7/1978 | Waugh ............................. | 428/64 X |
| 4,135,033 | 1/1979 | Lauton ............................ | 428/442 X |
| 4,210,693 | 7/1980 | Regan et al. .................... | 428/162 X |
| 4,259,388 | 3/1981 | Reed ................................. | 428/28 X |
| 4,331,704 | 5/1982 | Watson, Jr. et al. ............ | 427/54.1 |
| 4,332,074 | 6/1982 | Auld et al. ...................... | 264/132 X |
| 4,351,686 | 9/1982 | Clark ............................... | 428/448 X |
| 4,356,617 | 11/1982 | Coscia ............................. | 264/132 X |
| 4,409,264 | 10/1983 | Gilleo et al. .................... | 428/156 X |
| 4,446,179 | 5/1984 | Waugh ............................. | 428/31 |
| 4,460,429 | 7/1984 | Coscia et al. ................... | 156/219 X |
| 4,481,160 | 11/1984 | Bree ................................. | 428/13 X |
| 4,521,479 | 6/1985 | Maglio et al. ................... | 428/507 X |
| 4,605,575 | 8/1986 | Auld et al. ...................... | 428/542.2 X |

FOREIGN PATENT DOCUMENTS 58-93984  6/1983  Japan .
58-136078  10/1983  Japan .
58-192679  12/1983  Japan .

*Primary Examiner*—Henry F. Epstein
*Attorney, Agent, or Firm*—Killworth, Gottman, Hagan & Schaeff

[57] ABSTRACT

A plastic-capped decorative article and method of manufacture are provided. The article includes a plastic cap which is applied over a decorated embedment positioned on a layer of pressure sensitive adhesive and then cured. Optionally, the upper surface of the adhesive may be treated to render its substantially tack free and suitable for printing thereon prior to the application of the plastic cap.

12 Claims, 2 Drawing Figures

SUBSTRATELESS DECORATIVE EMBEDDED ARTICLE AND METHOD OF MAKING

CROSS REFERENCE TO RELATED APPLICATIONS

This application is a continuation-in-part of U.S. application Ser. No. 744,128, filed June 12, 1985, now U.S. Pat. No. 4,615,754.

BACKGROUND OF THE INVENTION

This invention relates to a plastic-capped decorative article and methods of making same, and more particularly to methods of making emblems having a decorative embedment encapsulated in a cured plastic resin.

Decorative plaques and emblems are widely used throughout a number of industries, including the automotive and appliance industry. Many of these decorative emblems are formed on metal or plastic substrates onto which a liquid plastic resin is cast. The plastic resin cures to form a convex or positive meniscus-shaped cap over the substrate which gives a lens effect to the printed decorative indicia on the substrate. Such emblems are conventionally adhered to their intended surface, such as an automobile or applicance body, utilizing a pressure sensitive adhesive coated on the back of the emblem substrate.

Also known generally is the concept of encapsulating an article in plastic by casting, partially curing, inserting the article, casting again, and completing the cure. For example, in Brody, U.S. Pat. No. 3,660,211, the article is a metal foil of a multicolored iridescent body embedded between two layers of a polyester resin; in Smith, U.S. Pat. No. 3,312,197, the article is a facsimile of a coin embedded between a transparent and an opaque, colored plastic resin material; and in Miori, U.S. Pat. No. 4,067,947, the article is embedded between two different layers of plastic resin material. Also, Bree, U.S. Pat. No. 4,481,160, discloses a method of encapsulating a decorative foil shape in a preformed bezel by casting a plastic resin material over the foil shape.

However, previous encapsulation processes resulted in relatively thick inflexible articles and involved several manufacturing steps which were relatively costly. Conventional plastic-capped decorative emblems require a self-supporting substrate of metal, paper, or plastic onto which the plastic resin is cast. The cost of such substrates represents a significant portion of the cost of the emblem. Additionally, many procedures form the emblems using die cutting operations which results in the waste of large portions of the substrate material which is discarded as scrap.

Accordingly, the need exists in the art for a method of making a plastic-capped decorative article with embedded foil shape which provides a relatively thin and flexible article and which is relatively inexpensive to manufacture.

SUMMARY OF THE INVENTION

The present invention provides a method of making a plastic-capped, substrateless decorative article having a decorative embedment encapsulated therein. According to one aspect of the present invention, a substrateless decorative article is made by the steps of providing a layer of a pressure sensitive adhesive on a support surface. A preformed decorative embedment is then placed on the first (upper) surface of the adhesive, and a curable liquid plastic resin is applied onto the upper surface of the adhesive layer and over the embedment. The resin is then cured to harden it, encapsulating the embedment and forming a substrateless decorative assembly having a plastic cap thereon. In a preferred embodiment, the plastic resin is applied over a plurality of embedments which are spaced apart. After curing of the plastic cap, individual articles may be die cut, stamped out, or otherwise separated from the assembly.

In a preferred method of forming the article, the layer of pressure sensitive adhesive is supported on a sheet or web of release liner which has been coated so that it may be readily peeled away from the adhesive article prior to use. The adhesive may be applied to the release liner in a conventional manner such as by spraying or roll coating. The adhesive may be clear, or it is preferably colored to provide a decorative background for the embedment.

The decorative embedment may be made of metal, paper, plastic, or the like. It may be a preformed letter or series of letters (spelling out a word) to be viewed either through a clear plastic cab or a clear pressure sensitive adhesive. Alternatively, the embedment may be in the form of a disc, the surface of which has been printed or decorated. The embedment may also be embossed to provide a three-dimensional effect. The embedment is readily seated in position by placing it on the pressure sensitive adhesive.

The plastic cap which is formed may be in the form of a lens or positive meniscus which forms as the liquid resin is cast onto the adhesive layer. The plastic is supplied in an amount which is sufficient to cover and encapsulate the embedment. Alternatively, a relatively flat cap may be applied by flow coating, spraying, or extruding a liquid resin onto the first (upper) surface of the adhesive and over the embedment. These latter alternative procedures are preferred where a relatively large support sheet or web is used, and a plurality of articles may be then separated after the resin has cured.

Optionally, the first surface of the pressure sensitive adhesive may be rendered substantially tack free and suitable for the printing of indicia thereon prior to the application of the plastic resin. This procedure may be performed for all or only certain portions of the first surface of the adhesive, as desired. This may be accomplished by, for example, coating or spraying the first surface of the adhesive with a hardenable or curable liquid, by coating with a particulate material, by coating with a hot stamp foil, or by spray metallizing the surface. These detackifying procedures may leave either a clear or colored, transparent surface, or may be opaque. In this manner, the background color of the article may be determined by the color of the pressure sensitive adhesive, the color of the detackified surface, or a combination of the two.

The thus treated first (upper) surface of the adhesive may then optionally be printed or otherwise decorated by silk-screening or other conventional printing techniques. After the embedment has been positioned, and the plastic-capped articles have been formed and cured, individual articles may then readily be separated from the assembly by die cutting, stamping, or other conventional separation techniques. They may be supported on the release liner until they are ready to be applied to an intended surface.

The present invention thus provides plastic-capped decorative articles without the need for an intermediate metal, paper, or plastic substrate as required by the prior art. The plastic-capped articles produced by the process of the present invention provide increased flexibility and relative ease of manufacture.

Accordingly, it is an object of the present invention to provide a process for making a substrateless plastic-capped decorative article and the article produced thereby. This, and other objects and advantages of the invention, will become apparent from the following detailed description, the accompanying drawings, and the appended claims.

DETAILED DESCRIPTION OF THE PREFERRED EMBODIMENTS

Figure 1:
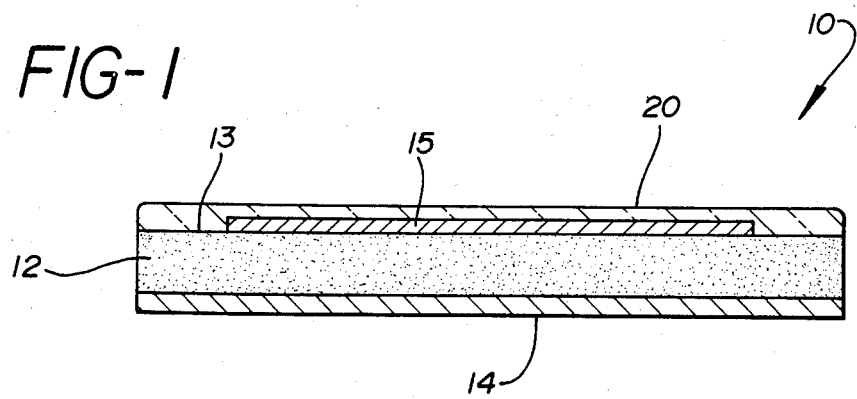
FIG. 1 is a cross-sectional side view of a plastic-capped decorative article produced by the process of the present invention.
Figure 2:
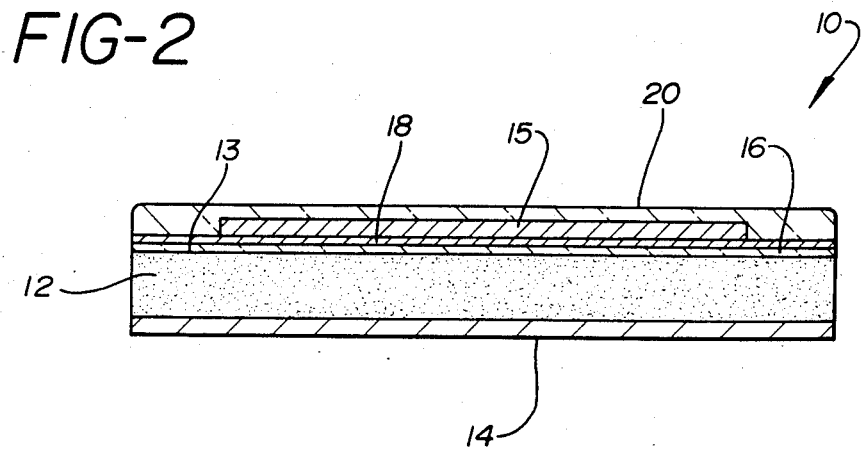
FIG. 2 is a cross-sectional side view of a plastic-capped decorative article having a detackified adhesive surface which has been decorated, produced by another embodiment of the process of the present invention.

FIGS. 1 and 2 illustrate, in cross-section, plastic-capped adhesive articles produced by alternative embodiments of the present invention. Article 10 has a layer of pressure sensitive adhesive 12 having a first upper surface 13 and a second lower surface. Pressure sensitive adhesive 12 can be any of a number of commercially available adhesives such as, for example, an acrylic pressure sensitive adhesive. The lower surface of adhesive 12 is adhered to a release liner 14 or other releasable support surface. Liner 14 is preferably coated with a release material such as a silicone-based polymer which permits ready removal of article 10 when it is desired to adhere article 10 to an intended substrate. Of course, other known release agents may also be utilized on liner 14.

Adhesive 12 may be applied to liner 14 by any suitable means such as by spraying or roll or dip coating. Preferably, adhesive layer 12 is applied in a thickness of from between about 0.002 to 0.010 inches.

Decorative embedment 15 is then positioned on adhesive 12. Embedment 15 is illustrated, for purposes of description, as a relatively thin, flat foil shape. However, embedment 15 may take any convenient form. Alternatively, a plurality of embedments may be positioned on a single article. As illustrated, the embedment does not extend to the peripheral edges of the article. Embedment 15 may be made of metal, paper, plastic, or the like. Preferably, it is prepared from an aluminum or aluminum alloy sheet which is brushed, decorated or printed by either a silkscreen or lithographic printing process, and then cut to size and desired shape. Optionally, embedment 15 may be embossed to yield a three-dimensional appearance. Preferably, the height of such an embossment is in the range of 0.01 inches.

As shown in FIG. 2, the adhesive 12 may then optionally be treated to render the upper surface 13 of the adhesive substantially tack free and suitable for printing indicia 18 directly thereon. The lower surface of adhesive 12 remains tacky so that the finished article may be adhered to an intended surface. The treatment of upper surface 13 of adhesive 12 to render it substantially tack free and suitable for printing directly thereon may be accomplished by a number of different procedures such as coating, spraying, or extruding with a hardenable or curable liquid material such as a lacquer or transparent synthetic polymer resin, coating or dusting with a particulate material, hot stamping with a metal foil, spray metallizing, applying a cross-linking agent to the surface of the adhesive, or applying heat or light energy (e.g., ultraviolet light) to cross-link the surface of the adhesive. All of these treating procedures produce a non-selfsupporting surface 16 which is substantially tack free and printable.

In one preferred procedure, upper surface 13 of adhesive 12 is overcoated with a thin layer of a transparent, clear or colored lacquer which forms non-tacky surface 16 and seals the upper surface of the adhesive. Alternatively, upper surface 13 may be dusted with a fine particulate material of inert particles such as mica or talc. Upper surface 13 may also have a thin curable liquid polymer resin applied thereto by coating, spraying, or extruding.

In yet another alternative procedure, a bright metallic surface may be applied to upper surface 13. This can be accomplished by applying a bright metal hot stamp foil to upper surface 13 by means of a pressure roll or the like. The foil is accompanied by a carrier film which is then stripped away leaving a bright metallic non-tacky and printable surface 16. The metallic surface may be gold, silver, or chrome colored, or other colors may be used as desired. The overall thickness of the bright metallic surface is desirably 0.001 inches or less.

Once upper surface 13 has been treated and rendered substantially tack free, any suitable indicia 18 may be printed directly thereon. These printable indicia may include letters, numbers, words, symbols, pictures, or other decoration. The printing may be accomplished by any of a number of printing techniques which are known in the art, including silk-screen printing. Embedment 15 is then positioned as desired onto the decorated surface. Alternatively, embedment 15 may be positioned and then the exposed areas of adhesive 12 may be treated as described to render them substantially tack free.

Adhesive layer 12 may itself be colored by the addition of suitable pigments or dyes to the composition. If layer 12 is already colored, the need for overprinting a colored background and/or treating the upper surface 13 of adhesive 12 to render it substantially tack free may be eliminated. Likewise, if layer 12 is clear, areas of the upper surface of the adhesive may be left undecorated by indicia 18 so that when the article is applied to a substrate, the color or brightness of the substrate shows through in those areas.

After embedment 15 has been positioned, either directly on adhesive 12 as shown in FIG. 1 or on decorated surface 16 as shown in FIG. 2, a curable liquid plastic resin is applied onto the structure. In one embodiment, where it is desired to form individual articles separately, the liquid plastic resin is cast onto the structure and flows to the edges of the structure forming a positive-shaped meniscus. This meniscus contributes to the lens effect of the plastic cap which is formed when the resin is cured.

Alternatively, a relatively flat cap, such as is illustrated in FIGS. 1 and 2, may be applied by flow coating, spraying, or extruding a liquid resin onto the upper surface of the structure. These latter alternative procedures are preferred where a plurality of individual articles are supported on a single larger sheet, roll, or web of release liner 14. Once plastic cap 20 has been cured, individual articles may then be die cut, stamped out, or otherwise separated from the larger sheet. In one embodiment, the individual articles may be kiss-cut (i.e., cut through to release liner 14) and left on the larger sheet or roll. In this manner, they may be shipped to ultimate users who may then readily peel the individual articles from release liner 14 for adherence to intended substrates. It will be apparent that articles of any shape or size may be formed including squares, rectangles, circles, ovals, elongated strips, and the like.

The plastic resin utilized is preferably a clear thermosetting material which is resistant to abrasion and impact. A number of plastics can be used for this purpose, but one which is particularly advantageous is an impact-resistant polyurethane. Polyurethanes useful in the practice of the present invention are two-part compositions which are the reaction product of a glycol, such as a polyether or polyester glycol, and an aliphatic diisocyanate.

The cast plastic resin is cured or otherwise hardened to form plastic cap 20. The resin is preferably cured by heating or ultraviolet radiation. However, depending on the particular composition utilized, other methods such as radio frequency heating, hot air drying, or even the heat of an exothermic curing reaction may be utilized.

In the practice of the present invention, a unique substrateless (i.e., meaning that there is no self-supporting paper, cardboard, plastic, or metal substrate as such) article is produced which is useful in a number of ornamental and decorative applications including decorative emblems on automobile bodies, appliances, and the like. Additionally, the process of the present invention can produce a reverse decal which can be adhered to clear, transparent surfaces such as glass. Thus, a clear adhesive supported on a release liner may be used in combination with a printed or decorated embedment which is positioned printed side down on the adhesive. A colored plastic cap is then applied to form a colored background for the embedment. When the release liner is peeled away, the article may be adhered to any glass surface so that the decorated embedment is visible.

While the invention has been described in detail and by reference to specific embodiments thereof, it will be apparent that numerous modifications and variations are possible without departing from the scope of the invention, which is defined in the appended claims.

What is claimed is:

1. A method of making a substrateless decorative article comprising the steps of:
   (a) providing a layer of pressure sensitive adhesive having a first surface,
   (b) placing a preformed decorative embedment on said first surface of said adhesive layer,
   (c) casting a curable liquid plastic resin onto said adhesive layer and over said embedment, and
   (d) curing said resin to harden it, encapsulating said embedment and forming a decorative article.

2. The method of claim 1 including the step of supporting said adhesive on a release liner.

3. The method of claim 1 including the step of treating said first surface of said pressure sensitive adhesive prior to placing said embedment thereon to render said first surface substantially tack free and suitable for printing of indicia directly thereon.

4. The method of claim 3 including the step of decorating said treated surface by printing indicia directly thereon.

5. The method of claim 3 in which said treating step includes applying a lacquer over said first surface of said pressure sensitive adhesive.

6. The method of claim 3 in which said treating step includes applying a particulate material on said first surface of said pressure sensitive adhesive.

7. The method of claim 6 in which said particulate material is selected from the group consisting of mica and talc.

8. The method of claim 3 in which said treating step includes applying a hot stamp metal foil over said first surface of said pressure sensitive adhesive.

9. The method of claim 1 including the step of treating exposed areas of adhesive around said embedment to render said first surface of said pressure sensitive adhesive substantially tack free and suitable for the printing of indicia directly thereon.

10. The method of claim 1 in which said layer of pressure sensitive adhesive material is colored.

11. The method of claim 1 in which said curable liquid plastic resin is colored.

12. The method of claim 1 in which said embedment is a series of preformed letters.

* * * * *